No. 720,301. PATENTED FEB. 10, 1903.
M. J. VOGLER.
COMBINED SAUSAGE STUFFER AND LARD OR JELLY PRESS.
APPLICATION FILED APR. 28, 1902.
NO MODEL.
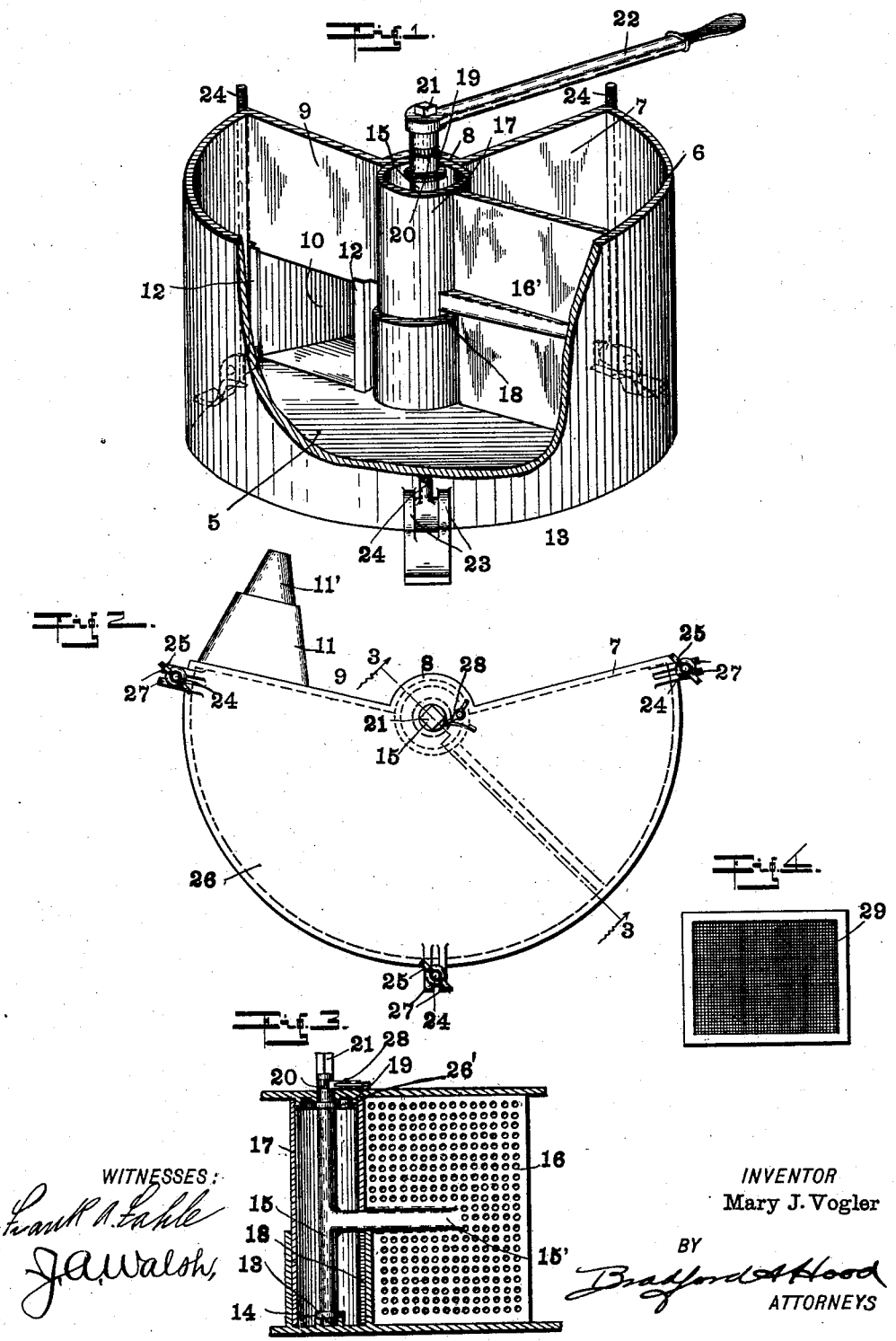
WITNESSES:
INVENTOR
Mary J. Vogler
BY
ATTORNEYS

UNITED STATES PATENT OFFICE.

MARY J. VOGLER, OF TIPTON, INDIANA.

COMBINED SAUSAGE-STUFFER AND LARD OR JELLY PRESS.

SPECIFICATION forming part of Letters Patent No. 720,301, dated February 10, 1903.

Application filed April 28, 1902. Serial No. 104,919. (No model.)

*To all whom it may concern:*

Be it known that I, MARY J. VOGLER, a citizen of the United States, residing at Tipton, in the county of Tipton and State of Indiana, have invented certain new and useful Improvements in a Combined Sausage-Stuffer and Lard or Jelly Press, of which the following is a specification.

The object of my invention is to produce a cheap yet efficient machine with which "casings" may be stuffed with sausage or other chopped meats and in which by slight change the machine may be made capable of expressing the juices from fruits preliminary to the production of wine or jelly or for expressing lard from meat-fats.

The accompanying drawings illustrate my invention.

Figure 1 is a perspective view of my improved machine, the top being removed and a portion of the side wall being broken away to show the interior construction. Fig. 2 is a plan. Fig. 3 is a section on line 3 3 of Fig. 2. Fig. 4 is an elevation of a removable screen to be used when making lard and jelly.

In the drawings, 5 indicates a segmental barrel-like body, the wall 6 of which is arc-shaped. A wall 7 is imperforate and leads from one end of the wall 6 to a central arc-shaped portion 8, while a wall 9 leads from the opposite end of the wall 6 to the portion 8 and is provided at its bottom with an opening 10, from which leads a discharge-spout 11, which is provided with an extension 11', to which the casings may be secured during the process of stuffing the same. Arranged adjacent the opening 10 are screen-guards 12, the purpose of which will appear.

Extending upward from the bottom of body 5 is a hollow cylindrical bearing 13, which extends about half of the height of the body, the portion 8 being a continuation of one side of the said bearing. Arranged in the bottom of the interior of the bearing 13, at the center thereof, is a step-bearing 14, which is adapted to receive the spindle 15 of any one of a plurality of followers 16'. Each of said followers is of external dimensions such as to fit in the interior of the main body 5 and is connected to its spindle by a bar 15', which operates the follower from its spindle, as shown. In order to prevent material from passing into the interior of the tubular bearing 13, I provide a sleeve 17, which fits snugly within the tubular bearing 13, said sleeve being provided with a vertical slot 18 at its upper end to receive the arm 15'. Spindle 15 is provided near its upper end with a flange or collar 19, a series of ratchet-teeth 20, and a polygonal end 21, to which may be attached an operating-handle 22.

The body 5 is supported by suitable legs, and the said body carries a plurality of lugs 23, to each of which is pivoted a pin 24, which extends upward alongside the body and is provided at its upper end with a screw-threaded portion, upon which is placed a thumb-nut 25. The upper end of the body is closed by a removable cover 26, provided with a plurality of pairs of ears 27, with which the thumb-nuts 25 may be engaged. Cover 26 is perforated to receive the upper end of any one of the spindles 15 and engages the flanges 19 thereof to hold the same in position. Formed on the inside of cover 26, surrounding the opening through which the spindle 15 projects, is an annular rib 26', which fits within and securely holds the tube 17 in position at its upper end. Cover 26 carries a ratchet 28, adapted to engage the teeth 20 of any one of the spindles 15, so that the follower may be held in any position to which it may be brought.

For the stuffing of sausages the follower 16' will be imperforate, and the material to be forced into the sausage-casings will be placed between the follower and the wall 9, so that by swinging the follower from wall 7 toward wall 9 the material in the main body of the casing may be forced through the spout 11 11'. When it is desired to use the machine for expressing lard or fruit-juices, cover 26 is removed and the follower 16', together with tube 17, withdrawn. The follower 16, which is suitably perforated, as shown in Fig. 3, is then placed in position with its spindle 15 seated in the bearing 14 and tube 17 slipped over spindle 15 and into the tubular bearing 13. The follower 16 is then swung around to wall 9, and the material to be pressed is placed between the follower and partition 7. A suitable screen 29, as shown in Fig. 4, is then placed over opening 10, being supported in position by the guides 12. After the cover has been readjusted and clamped in position by the thumb-nuts 25 the follower 16 may be moved toward wall 7, so as to express the juices from the material and allow the same to run out of spout 11.

I claim as my invention—

1. In a machine of the class described, the combination of the main body forming a segmental annular receiving-chamber, a discharge-spout leading from one end thereof, a tubular bearing 13 arranged in the bottom of the body at the axis thereof, a removable cover, a follower adapted to fill the annular chamber transversely and carrying a spindle 15 connected thereto by bar 15', suitable bearings carried by the bottom of the body and by the cover for receiving any one of such spindles, and a sleeve 17 separable from the follower and adapted to fit within the tubular bearing 13 and to extend therefrom to the cover so as to protect the spindle, substantially as and for the purpose set forth.

2. In a machine of the class described, the combination of the main body forming a segmental annular receiving-chamber, a discharge-spout leading from one end thereof, a tubular bearing 13 arranged in the bottom of the body at the axis thereof, a removable cover carrying on its under side an annular rib, a follower adapted to fill the annular chamber transversely and carrying a spindle connected thereto by a bar, suitable bearings carried by the bottom of the body and by the cover for receiving said spindle, and a sleeve 17 arranged to receive said spindle but separable therefrom and adapted to fit within the tubular bearing 13 and to extend therefrom to the cover so as to protect the spindle, substantially as and for the purpose set forth.

In witness whereof I have hereunto set my hand and seal, at Tipton, Indiana, this 23d day of April, A. D. 1902.

MARY J. VOGLER. [L. S.]

Witnesses:
J. N. NEUGH,
JOHN P. KEMP.